United States Patent

Klomhaus et al.

[11] Patent Number: 5,804,123
[45] Date of Patent: Sep. 8, 1998

[54] METHOD OF MAKING PLASTIC PART HAVING PARTING LINE FREE O-RING GROOVE FOR FLUID OUTLET

[75] Inventors: Jaime L. Klomhaus, Shelby Township; Richard J. Barton, Port Huron, both of Mich.

[73] Assignee: Huron Plastics Group, Inc., Port Huron, Mich.

[21] Appl. No.: 238,573

[22] Filed: May 5, 1994

Related U.S. Application Data

[63] Continuation of Ser. No. 964,513, Oct. 21, 1992, abandoned.

[51] Int. Cl.[6] .................................................. B29C 45/44
[52] U.S. Cl. .................... 264/318; 264/328.1; 264/336; 425/577; 425/DIG. 58
[58] Field of Search ..................... 264/318, 334, 264/328.1, 336; 425/DIG. 58, 577; 249/63

[56] References Cited

U.S. PATENT DOCUMENTS

| | | | |
|---|---|---|---|
| 2,583,441 | 1/1952 | Palmer | 264/336 |
| 3,343,222 | 9/1967 | Kacalieff | 425/DIG. 58 |
| 3,402,713 | 9/1968 | Senkowski et al. | 264/318 |
| 3,987,144 | 10/1976 | Nickold | 264/318 |
| 4,113,829 | 9/1978 | Bowker et al. | 264/336 |
| 4,210,620 | 7/1980 | von Holdt | 264/318 |
| 4,263,249 | 4/1981 | Mayumi et al. | 264/336 |
| 4,428,899 | 1/1984 | van Manen | 264/336 |
| 4,709,757 | 12/1987 | Bly | 264/336 |
| 4,856,980 | 8/1989 | Laurita | 425/572 |
| 4,873,043 | 10/1989 | Meyers | 264/336 |
| 4,876,050 | 10/1989 | Horton | 264/336 |
| 4,983,346 | 1/1991 | Curliss et al. | 425/DIG. 58 |
| 5,114,655 | 5/1992 | Cole | 425/DIG. 58 |

OTHER PUBLICATIONS

*Plastics Engineering Handbook,* edited by Joel Frados, 4TH Edition, 1976, pp. 204–207 and 220–223.

Primary Examiner—Jill L. Heitbrink
Attorney, Agent, or Firm—Brooks & Kushman P.C.

[57] ABSTRACT

A plastic molded part having a parting line free O-ring groove formed on a tubular portion of the part is made by molding the groove utilizing cooperating inner and outer axially moveable die portions in which an inner die member is withdrawn from the tubular plastic just before the outer die member is withdrawn, with the withdrawal of the members occurring after the plastic has begun to set but before it has assumed its final cure, whereby the plastic may flex inwardly as the outer die is withdrawn and then may spring back outwardly to its proper position for final cure.

4 Claims, 2 Drawing Sheets

METHOD OF MAKING PLASTIC PART HAVING PARTING LINE FREE O-RING GROOVE FOR FLUID OUTLET

This is a continuation of application Ser. No. 07/964,513 filed on Oct. 21, 1992 now abandoned.

FIELD OF INVENTION

This invention relates to the manufacture of molded plastic parts, such as for handling coolants in cooling systems for automotive internal combustion engines.

BACKGROUND OF THE INVENTION

In an effort to avoid machining, it has become desirable to fabricate coolant system components for automotive engines from molded plastic such that when the plastic parts emerge from the molds they are in a finished ready-to-use condition. Examples of this effort are disclosed in U.S. Pat. Nos. 4,709,757 and 4,873,043 where molded plastic parts having a tubular end for receiving a hose are molded without flash on the hose-receiving tubular part so that machining is avoided and the inside of the tubular part is designed to avoid out-of-roundness as the part cools during fabrication. In making parts according to the teaching of these patents the core member is withdrawn axially from the part during its formation to allow the plastic to shrink inwardly away from the encircling cylindrical mold surface as the plastic cools, and after such shrinkage the encircling mold surface is withdrawn axially from the part. This enables an enlarged lip formed on the exterior of the part to clear the groove on the inner cylindrical surface of the mold. It has been found that the delay in molding occasioned by waiting while the plastic shrinks away from the cylindrical encircling mold surface increases the part cost but also requires a more complicated mold motion control system with increased attendant costs. Accordingly it has become desirable to reduce molding time and simplify mold control and concomitant machine cost. Additionally it is desirable to form parts having flashless O-ring grooves for effecting seals within openings in the coolant system into which a plastic part may be inserted.

SUMMARY OF THE INVENTION

The method aspect of making a plastic part according to this invention in which there is a tubular portion with an external, encircling, flashless O-ring groove (i.e., an O-ring groove without a parting line at the groove) comprises the steps of providing an injection mold with a cavity member formed with a cavity having a cylindrical surface portion with an encircling inwardly extending rib located to form the O-ring groove and a core member removably inserted in the cavity member and spaced from the cylindrical surface to support molten plastic filling the cylindrical surface adjacent the rib; molten plastic is injected into the cavity so that the plastic extends into the cylindrical portion and around the core member; and finally in one continuous motion, after the plastic material in the cylindrical portion of the mold has solidified enough to retain its tubular shape and acquire some resiliency, but before it has assumed its final solidification, first withdrawing the core member from the cylindrical portion of the cavity member and immediately thereafter withdrawing the cavity member causing said rib to resiliently deflect the tubular portion as the rib is withdrawn thereover with the plastic material springing back to its molded tubular shape to form the O-ring groove in the tubular part. In the apparatus aspect of the invention, the cavity member is formed by a floating sleeve mounted on the core and activated by it.

BRIEF DESCRIPTION OF PREFERRED EMBODIMENTS

Figure 1:
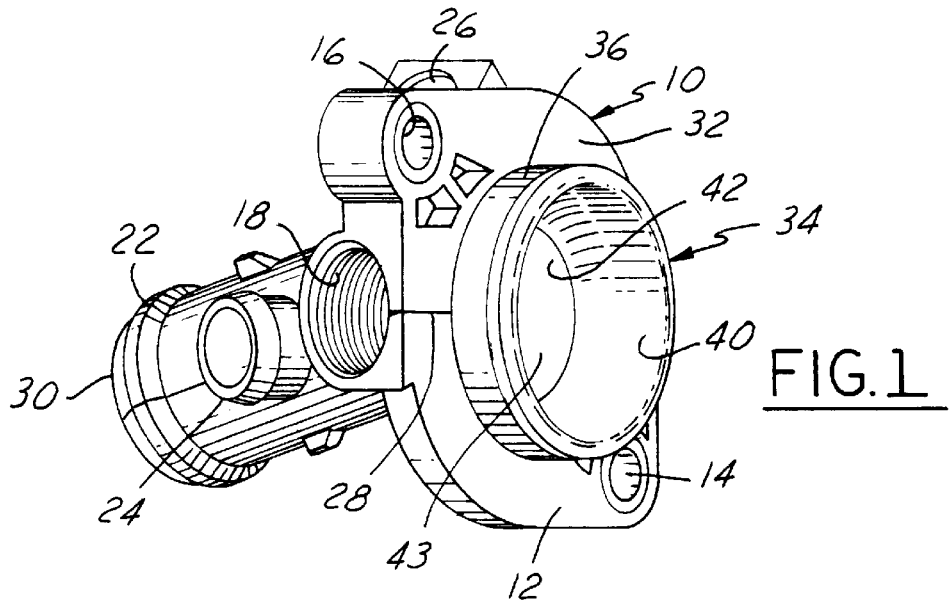
FIG. 1 is a perspective view of a plastic part having a flashless O-ring groove fabricated according to this invention.

A plastic coupling or part for an automotive cooling system is shown at 10 as being of generally tubular configuration and having a flange 12 provided at substantially opposite diameters with through apertures 14 and 16 in which have been insert molded metal sleeves for receiving fasteners for attaching the coupling to the automotive cooling system. A threaded aperture 18 opens radially of the flange.

The plastic part 10 has a hose receiving end portion 20 which may extend angularly away from the flange 12 with an enlarged encircling rib 22 at the outer end for receiving thereover a hose (not shown). A hose nipple 24 projects radially from the tubular hose end 20 and is also provided with an enlarged rib for receiving a hose thereupon. A further aperture 26 also opening radially of the flange may be provided if desired. The flange 12 and other portions of the plastic part hereinbefore described have been formed by a conventional two-part mold having cooperating mold halves which leave a faint parting line 28. The parting line extends from the end 30 to the face 32 of flange 12. Such parting line may have a small flash which, upon careful mold manufacture and molding techniques may be most of the time almost invisible.

Figure 2:
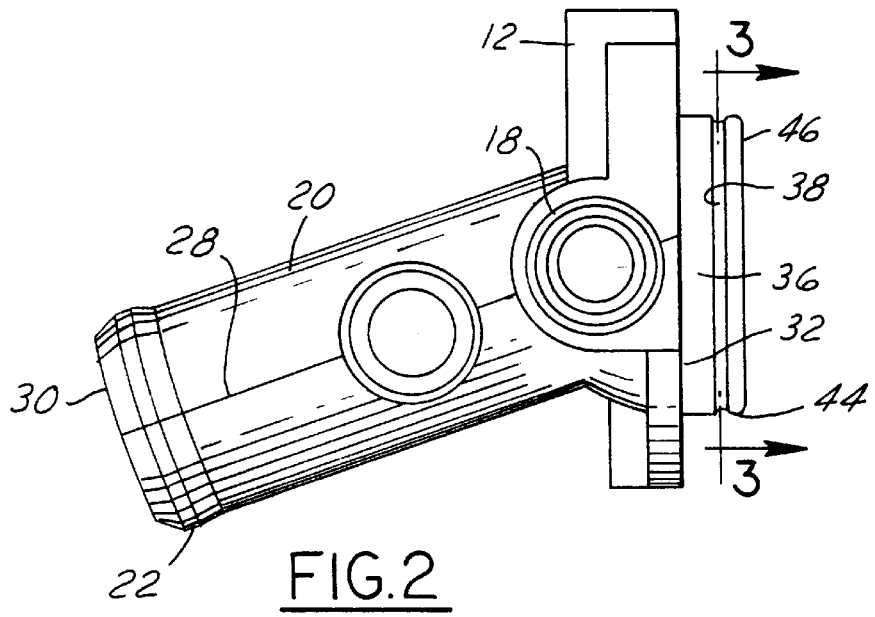
FIG. 2 is a side view of the part shown in FIG. 1.
Figure 3:
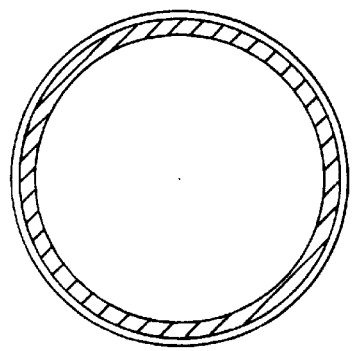
FIG. 3 a cross-sectional view taken on the line 3—3 of FIG. 2.

Projecting perpendicular to face 32 of the flange is a tubular portion 34 having an external cylindrical surface 36 interrupted by a circumferential O-ring groove 38. The interior of the tubular portion 34 has a cylindrical surface 40 which extends inwardly to a junction 42 with the cylindrical bore 43 of the hose receiving end portion 20. It will be noted particularly from FIG. 2 that the exterior surface of the tubular portion 34 is tapered inwardly at 44 adjacent the O-ring groove and between the O-ring groove and the end 46 of the tubular portion. This tapered portion 44 or nose facilitates the insertion of the tubular portion within a cylindrical opening (not shown) with which the tubular portion and the O-ring (not shown) cooperate to seal the coupling in the automotive cooling system. The tubular portion 34 and its associated O-ring are held within the opening of the cooling system by fasteners extending through the openings 14 and 16 of the flange.

Figure 4:
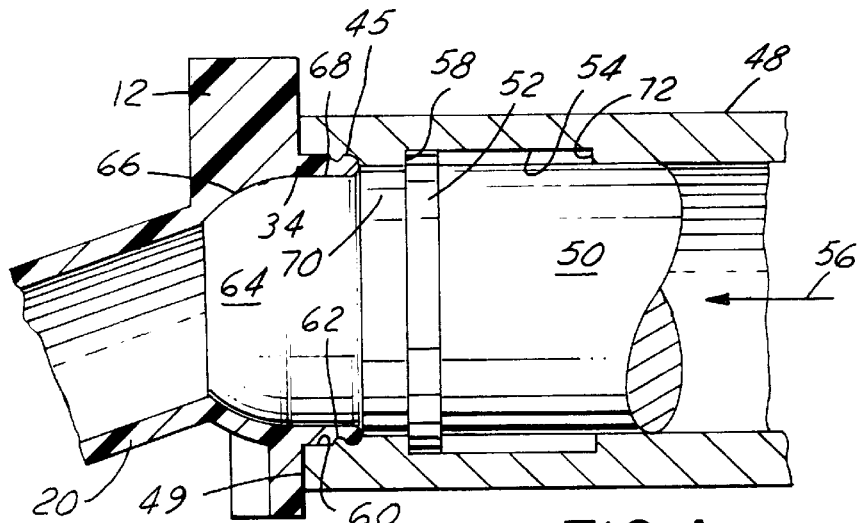
FIG. 4 shows the core and floating sleeve portions of the molding apparatus after the plastic has been injected but before the core or sleeve have been withdrawn.
Figure 5:
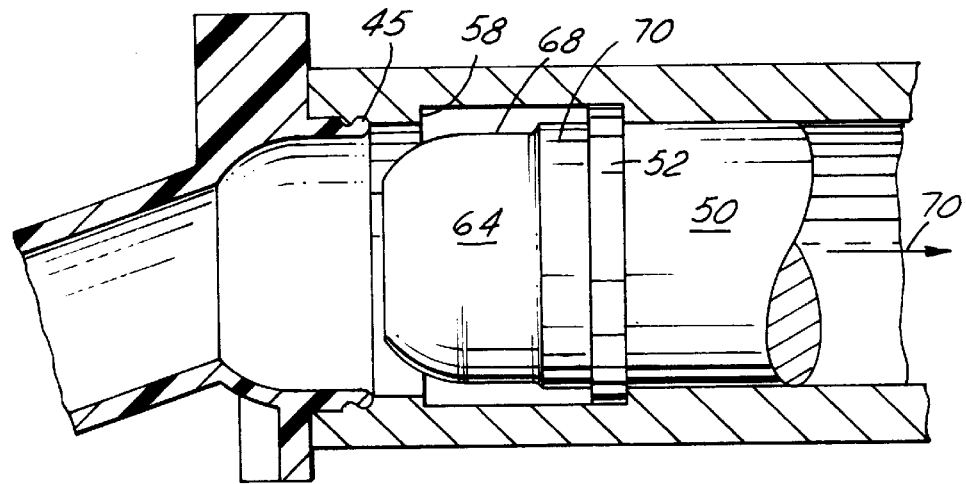
FIG. 5 shows withdrawal of the core from the position of FIG. 4.
Figure 6:
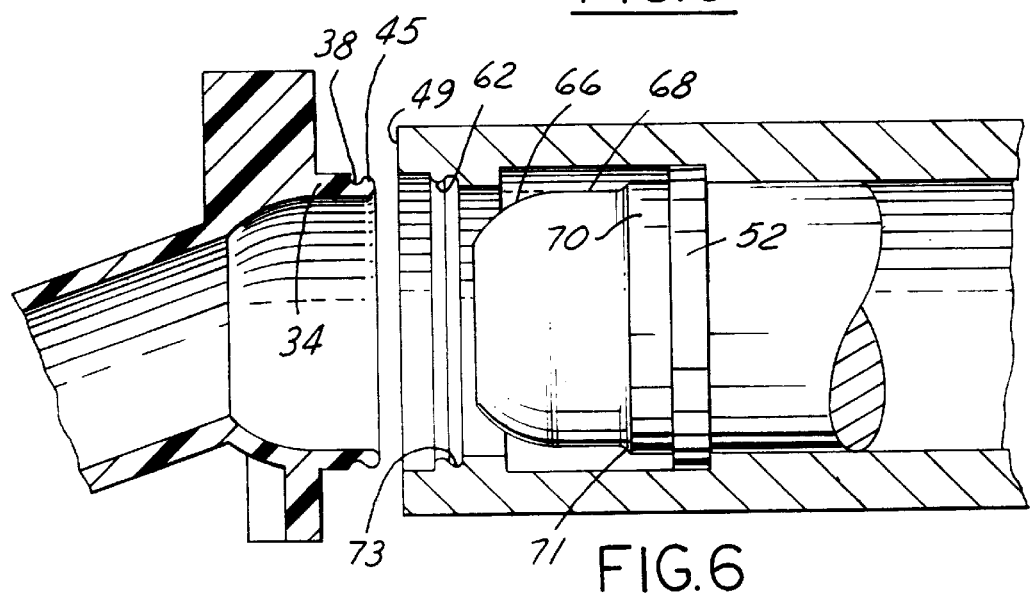
FIG. 6 shows the arrangement after withdrawal of the sleeve.

In FIGS. 4–6 there is shown schematically the molding steps to form the tubular portion without a parting line interrupting the O-ring groove or the external cylindrical surface 36. The molding is carried out using what may be referred to as a floating sleeve cavity member 48 mounted on a core member 50 and actuated thereby. The core member 50 and its floating sleeve 48 are part of a plastic injection molding apparatus. In FIG. 4 the core and sleeve are shown in the relative positions in which they are placed at the time the plastic is injected into the space between them. The core 50, which is of cylindrical configuration, has an encircling shoulder 52 which is received within an internal slot 54 in the floating sleeve cavity member 48. Upon movement of the core 50 in the direction of arrow 56 to its inmost position shown in FIG. 4, the shoulder 52 bears against the end wall 58 of the slot 54 urging the cavity member 48 to the left as depicted.

The cavity member or sleeve 48 is formed with a cylindrical surface portion 60 an encircling inwardly extending rib 62 located to form the O-ring groove 38. The core member 50 has a somewhat hemispherically shaped nose 64 having a spherically curved portion 66 terminating in a cylindrical portion 68. Cylindrical portion 68 joins an enlarged cylindrical surface or shoulder 70 which terminates at the shoulder 52. There is a small radius 71 at the intersection of the cylindrical surface 68 and the shoulder 70 which cooperates with a radiused groove 73 adjacent rib 62 to form the tapered and curved end 44 of the part. Surface 70 cooperates with the cylindrical surface 60 and cylindrical surface 68 to form a cylindrical cavity for receiving the plastic to form the tubular portion 34. Other parts of the mold (not shown) comprise conventional mold halves serving to form the flange, hose receiving end portion 20, and the other parts. Such mold halves cooperate with the sleeve 48 and core 50 to form the tubular part shown in FIG. 4.

With the floating sleeve 48 and core 50 positioned as shown in FIG. 4, the molten plastic material is injected into the cavity or space between the cylindrical surface portion 60 and the core 50. After the plastic material has solidified enough to retain its tubular shape and acquire some resiliency, but before it has assumed its final solidification, the core member is withdrawn from the cylindrical cavity in the direction of the arrow 70 along a line extending axially of the cylindrical portion 34. During withdrawal of the core 50 the sleeve or cavity member 48 is also withdrawn axially in the direction of arrow 70 along the same line, Withdrawal of the sleeve 48 commences immediately upon the core nose leaving the end of the still hot tubular plastic portion as shown in FIG. 5. As the sleeve is withdrawn it causes the rib 62 to resiliently deflect outer end 44 of the tubular portion by engagement with the radius 45 at the edge of the groove 38 as shown at FIGS. 4–6 as the rib is drawn thereover. The plastic material springs back to its molded tubular shape to form the O-ring groove in the tubular part as shown in FIG. 6.

The cavity member 48 is withdrawn from the tubular part as a result of the shoulder 52 on the core engaging the end wall 72 of the slot 54 during retraction of the core. There will be perhaps ¼–½ second delay between withdrawal of the core and withdrawal of the floating sleeve from the tubular part. Thus, unlike the prior art, there is essentially no delay between the withdrawal of the core member and the subsequent withdrawal of the cavity member.

Suitable plastics for use in forming the tubular member may be glass filled nylon such as DSM Staynl TW200F6. This is a 30 percent glass filled nylon available from DSM Engineering Plastics, Inc., of 501 Crescent Avenue, Reading, Pa. Other reinforced plastics may also be suitable.

It is critical to the satisfactory operation of the method herein disclosed that withdrawal of the core and floating sleeve be essentially simultaneous and that such occurs after the plastic has cooled sufficiently to retain its shape and acquire some resiliency but before it has assumed its final solidification. If the plastic is allowed to cool so that it reaches its final solidification before withdrawal of the sleeve member, undesirable stresses may be set up in the plastic at the time of withdrawal of the sleeve. By withdrawing the sleeve after the plastic has cooled to retain its shape and also have some resiliency, withdrawal of the sleeve may be effected without damage to the plastic and with the plastic capable of springing back to its molded shape. In addition, at the time of withdrawal of the sleeve 48, there has been no shrinkage of the plastic material away from the cylindrical surface 60 of the sleeve.

We claim:

1. A method of making a plastic part having a tubular portion with an external encircling O-ring groove with a sealing surface without a parting line at such groove comprising the steps of:

providing an injection mold having a sleeve member formed with an internal cylindrical surface having an encircling inwardly extending rib located to form said O-ring groove, and a core member axially moveable in said sleeve member and disposed in a first position in spaced cooperation with said cylindrical surface to form a cavity around said rib, said cavity enclosed by mating wall portions of said sleeve and said core for receiving and supporting molten plastic adjacent said rib;

injecting a molten plastic material into said cavity to fill it and extend around said core member and around said rib;

after the plastic material in said cavity has solidified enough to retain its tubular shape and acquire some resiliency but before it has assumed its final solidification, withdrawing in one continuous motion said core member from said first position along a line extending axially of said cylindrical surface to a second position spaced outwardly from the tubular plastic material, and during such motion of the core member and immediately it has cleared the tubular plastic material withdrawing said sleeve member in the same direction as and with the moving core member from the tubular plastic material axially along said line causing said rib to resiliently deflect the tubular portion away from said sleeve concentrically as the rib is drawn thereover with the tubular sleeve of plastic material concentrically springing back to its molded tubular shape to form the O-ring groove with said sealing surface in said tubular portion.

2. The invention defined by claim 1 wherein said withdrawal of the sleeve member occurs prior to shrinkage of the plastic material away from the cylindrical surface.

3. The invention defined by claim 1 wherein said withdrawing step includes causing the core member to engage the sleeve member during withdrawal of the core member to withdraw the sleeve member therewith after the core member has withdrawn a predetermined distance from the cylindrical surface of the sleeve member.

4. The invention as defined in claim 1 wherein an edge of said encircling groove in the same direction as said sleeve moves includes a radius, and further comprising biasing said molded part away from said mold wall by engaging said radius during movement of the sleeve in said same direction.

\* \* \* \* \*